R. J. BURROWS.
METAL WHEEL.
APPLICATION FILED MAY 15, 1917.
1,312,890.
Patented Aug. 12, 1919.
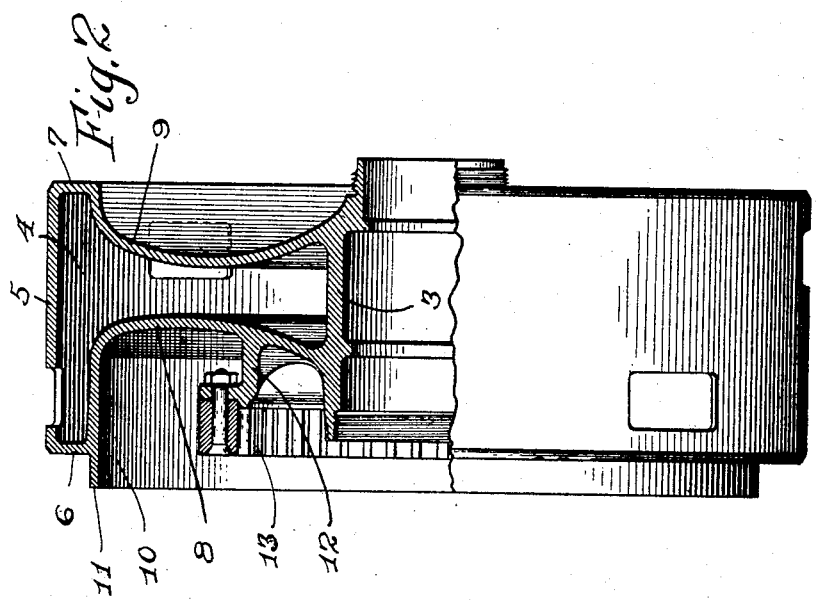
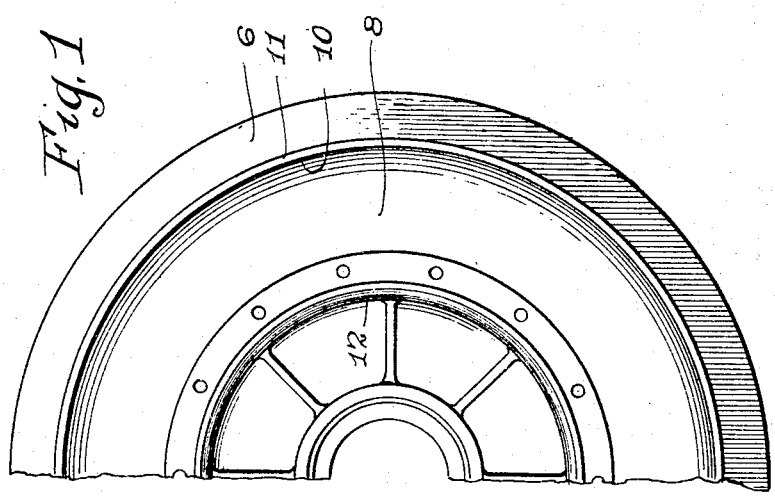

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

METAL WHEEL.

1,312,890.  Specification of Letters Patent.  Patented Aug. 12, 1919.

Application filed May 15, 1917. Serial No. 168,670.

*To all whom it may concern:*

Be it known that I, ROBERT J. BURROWS, a citizen of the United States, residing at Buchanan, in the county of Berrien and State of Michigan, have invented certain new and useful Improvements in Metal Wheels, of which the following is a specification, reference being had to the accompanying drawings.

My invention relates to metal wheels of the general type shown and described in Letters Patent of the United States to myself and Edwin B. Ross, No. 1,131,819, in which the wheel comprises a hub, and a rim having a tread portion and substantially radial marginal flanges suitably connected with the hub. My present invention has for its object to provide a wheel of that type with a brake-drum so formed and disposed that the braking strain will be applied near the rim of the wheel and will be sustained by the wheel in such manner and at such a point as to minimize the danger of breakage. A further object is to provide such a wheel with a driving gear so disposed with reference to the brake-drum as to make it practical to use a comparatively large driving gear without interference with the brakes. A still further object is to avoid the necessity of perforating the wheel for the attachment of the brake-drum, as is necessary where a separate drum is employed. I accomplish these objects as illustrated in the drawings and as hereinafter described. That which I believe to be new is set forth in the claims.

In the accompanying drawings,—

Figure 1 is a partial side elevation of my improved wheel; and

Fig. 2 is an edge view thereof, partly in section.

Referring to the drawings,—

3 indicates the hub of the wheel, and 4 the box-like rim, of which 5 is the tread portion, 6—7 are the marginal flanges extending substantially radially from the tread portion and connected respectively to the hub by webs 8—9 which, as shown, extend inwardly from the flanges 6—7 with which they are connected, and are curved toward each other, presenting the upper portions of their convex surfaces toward the tread 5. The inner portions of the webs separate as they approach the hub, with which they are connected at opposite sides of the longitudinal center thereof. In the construction shown, all the parts thus far described are shown as formed integral, the wheel illustrated being made of cast metal. The web 8 extends inwardly under the tread 5 to a somewhat greater extent than the web 9 and is supplied with a flattened inner surface 10 which forms a brake-drum adapted to coöperate with internal brakes (not shown) which may be of any suitable construction. Said web is also extended beyond the flange 6, as shown at 11 in Fig. 2, to provide a wider braking surface. It will be noted that by this construction the brake-drum 10 is very near the tread 5 of the wheel, and its outer portion, where the braking strain is more particularly applied, is firmly supported by the flange 6. Thus the braking strain is applied near the rim of the wheel where it is more effective, and the inner portions of the webs 8—9 and the hub are relieved from excessive strain.

The web 8 is provided with an outwardly-projecting flange 12 at a point between the hub and the brake-drum 10, to which is secured a driving gear 13, preferably an internal gear, as shown in Fig. 2. By this construction a large amount of space may be provided between the driving gear 13 and the brake-drum for the reception of the brakes.

While I have shown a wheel having webs 8—9 entirely separated throughout their length, I do not wish to be limited to using two entirely separated webs, as they may merge intermediately into a single web as shown and described in the pending application of myself and Edwin B. Ross, Serial No. 201, filed January 2, 1915, as a division of the application upon which our said patent was granted, but I prefer to employ the construction shown in the accompanying drawings.

Furthermore, certain features of my invention may be applied to metal wheels of other construction than that shown in said Burrows and Ross patent, as, for example, to wheels of the spoke type.

That which I claim as my invention, and desire to secure by Letters Patent, is,—

1. A metal wheel, comprising a hub, a hollow rim having a tread portion and a substantially radial marginal flange, a web integrally connected with said flange and forming a cylindrical braking surface adjacent to the rim of the wheel, said web being also connected with the hub, and means connecting the other margin of the rim with the hub.

2. A metal wheel, comprising a hub, a hollow rim having a tread portion and an inwardly-projecting annular flange, and a web connected with said flange and forming a cylindrical braking surface adjacent to the rim of the wheel, the inner portion of said web being connected with the hub.

3. A metal wheel, comprising a hub, a rim having a tread portion and a substantially radial marginal flange, a web connected with the hub, the outer portion of said web being supported intermediately by said flange forming a cylindrical brake-drum, and means connecting the other margin of the rim with the hub.

4. A metal wheel, comprising a hub, a rim having an inwardly-projecting substantially radial flange, a cylindrical brake-drum supported intermediately by said flange, and means connecting the rim with the hub.

5. A metal wheel, comprising a hub, a rim having an inwardly-projecting substantially radial flange, and a cylindrical brake-drum supported intermediately by said flange, the inner portion of said brake-drum being connected with the hub.

6. A metal wheel, comprising a hub, a hollow rim having a tread portion and substantially radial marginal flanges, a brake-drum integral with one of said flanges and extending inwardly and outwardly therefrom, the inner portion of said brake-drum being connected with the hub, and means connecting the other flange with the hub.

7. A metal wheel, comprising a hub, a rim having a tread portion and a substantially radial marginal flange, a web integral with said flange, the outer portion of said web forming a cylindrical braking surface adjacent to the wheel rim, said web being also connected with the hub, means connecting the other margin of said rim with the hub, and a driving gear carried by the wheel between said braking surface and the hub.

8. A metal wheel, comprising a hub, a hollow rim having a tread portion and substantially radial marginal flanges, a web connected with one of said flanges, the outer portion of said web forming a cylindrical braking surface adjacent to the wheel rim, said web being also connected with the hub, means connecting the other flange with the hub, and a driving gear carried by the wheel between the braking surface and the hub.

9. A metal wheel, comprising a hub, a rim having a tread portion and a substantially radial marginal flange, a cylindrical brake-drum supported intermediately by said flange and connected with the hub, means connecting the other margin of the rim with the hub, and a driving gear carried by the wheel between said brake-drum and the hub.

10. A metal wheel, comprising a hub, a hollow rim having a tread portion and substantially radial marginal flanges, a web connecting one of said flanges with the hub, the outer portion of said web forming a brake-drum, a driving gear carried by said web between said brake-drum and the hub, and a web connecting the other flange with the hub.

11. A metal wheel, comprising a hub, a hollow rim having a tread portion and substantially radial marginal flanges, and means connecting said flanges with the hub, comprising a brake-drum integral with and extending under one edge of said hollow rim.

ROBERT J. BURROWS.